United States Patent [19]

Ando

[11] 3,711,649

[45] Jan. 16, 1973

[54] CONTROLLER DEVICE OF AN AUTOMATIC TELEPHONE ANSWERING APPARATUS

[75] Inventor: Shizuo Ando, Katsushika-ku, Tokyo, Japan

[73] Assignee: Pioneer Electronic Corporation, Tokyo, Japan

[22] Filed: Feb. 9, 1971

[21] Appl. No.: 114,017

[30] Foreign Application Priority Data

Feb. 10, 1970 Japan ....................45/11087

[52] U.S. Cl. ....................179/6 R, 179/100.1 VC

[51] Int. Cl. ....................H04m 1/64

[58] Field of Search...179/6 R, 6 AC, 6 C, 100.1 VC, 179/1 VC

[56] References Cited

UNITED STATES PATENTS 2,815,401 12/1957 O'Dwyer....................179/6 R 3,133,992 5/1964 Dickman....................179/100.1 VC

FOREIGN PATENTS OR APPLICATIONS 1,055,596 1/1967 Great Britain....................179/6 R

*Primary Examiner*—Raymond F. Cardillo, Jr.

*Attorney*—Sughrue, Rothwell, Mion, Zinn & Macpeak

[57] ABSTRACT

The invention pertains to a controller device for use with an automatic telephone answering apparatus whereby an automatic answering operation is activated and remains activated to record an incoming message as long as the message arrives within a predetermined timer period. The apparatus is returned to a stand-by state after the incoming message is finished even if the predetermined timer period is not over. When the predetermined timer period is over, the apparatus is returned to its stand-by state even if the incoming message is not complete.

5 Claims, 2 Drawing Figures

CONTROLLER DEVICE OF AN AUTOMATIC TELEPHONE ANSWERING APPARATUS

BACKGROUND OF THE INVENTION

This invention relates generally to automatic telephone answering apparatus, and more particularly to a controller device of an automatic telephone answering apparatus.

In prior art automatic telephone answering apparatus, one of two methods is usually adopted to activate a recording operation to record an incoming message from a caller. One method is called a timer control method wherein a recording period is predetermined. The other method is called a voice control method wherein a recording operation continues as long as the message is received. Disadvantages of these prior methods are as follows.

In the time control method, the recording operation continues only for a predetermined period, without reference to existence of the incoming message. Therefore, when the incoming message is concluded early, a portion of the tape recording the incoming message remains unused. Furthermore, a telephone line remains needlessly occupied. After the predetermined time period, the apparatus returns to its stand-by state to await the next call, even if the incoming message continues from the caller. Therefore, it is possible for only part of a message to be recorded thus losing a portion of the message.

With the voice control method, the recording operation is continuously activated to record the incoming message as long as the message arrives. However, with such a method, due to other signals, such as dial tones, busy tones and other noise, or due to extremely long incoming messages, the recording operation is held active for a long time and the tape for recording incoming messages is again spent in vain.

SUMMARY OF THE INVENTION

The instant invention provides a novel and improved controller device which eliminates the aforementioned disadvantages of conventional automatic telephone answering apparatus. The controller of this invention holds the apparatus in the recording state as long as the incoming message arrives so long as a predetermined time period is not over. The apparatus returns to a stand-by state after the incoming message is concluded even if the predetermined timer period is not over.

The invention provides a controller device of an automatic telephone answering apparatus whereby a telephone line is not occupied needlessly and the magnetic tape for recording incoming messages is not wasted.

Other objects, features and advantages of the present invention will become apparent from the following description and accompanying drawings.

DESCRIPTION OF THE PREFERRED EMBODIMENTS

Figure 1:
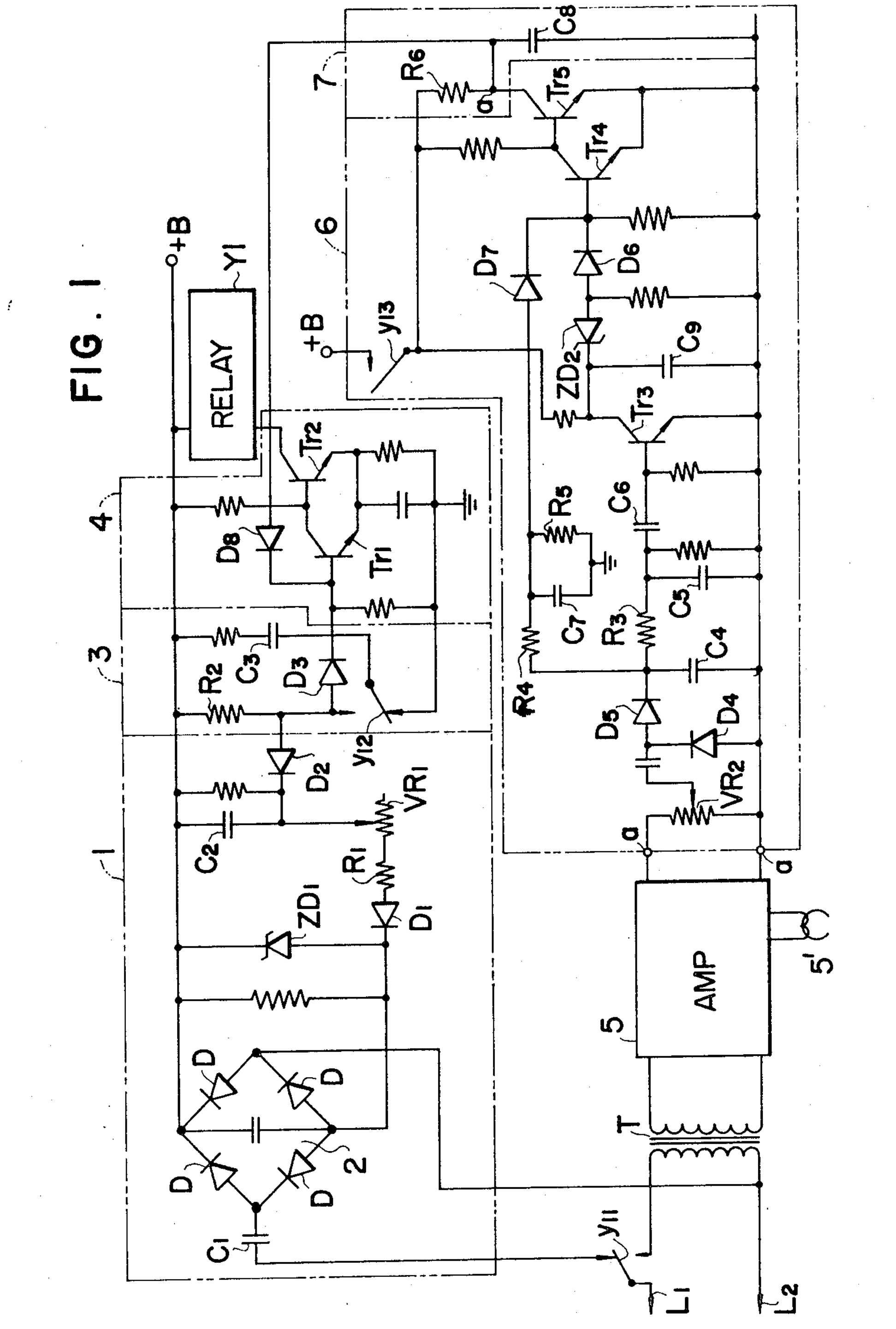
FIG. 1 shows a circuit of one embodiment of the present invention.

Referring to FIG. 1, a starter circuit 1 is composed of a full-wave rectification circuit 2 and a time constant circuit. The full-wave rectification circuit 2 is connected to telephone line L2 and to telephone line L1 through contact y11 of a relay Y1 and condenser C1. The rectification circuit 2 is composed of four diodes D and a smoothing condenser. The time constant circuit is composed of Zener diode ZD1, diode D1, resistor R1, variable resistor VR, and condenser C2. A timer circuit 3 is composed of a resistor R2, diode D3, another resistor, a condenser C3 and a contact Y12 of the relay Y1. The timer circuit is connected to the time constant circuit through a diode D2.

A switching circuit 4 is primarily composed of transistors Tr1 and Tr2. The base of the transistor Tr1 is connected to a node through the diode D3. At the node, the resistor R2 and the contact Y12 are connected. The collector of the transistor Tr2 is connected to the relay Y1 whereby the answering operation of the apparatus is controlled.

Telephone lines L1 and L2 are connected with the primary winding of a line-transformer T. The secondary winding of the line-transformer T is connected to an amplifier 5 which amplifies outgoing and incoming message signals. The output terminals of the amplifier 5 are connected to a discriminator circuit 6 which comprises a rectifier circuit, a noise absorbing circuit, a transistor Tr3 and a Schmitt trigger circuit. The rectifier circuit is composed of two diodes D4 and D5, and is connected with output terminals *a*, *a* of the amplifier 5 through a variable resistor VR2. Variable resistor VR2 determines the signal level. The noise absorbing circuit is composed of condensers C4 and C5 and a resistor R3, and is connected to the rectifier circuit. The base of transistor Tr3 is connected to the output terminals of the noise absorbing circuit through a condenser C6. The collector of transistor Tr3 is connected to the base of transistor Tr4 through a base bias circuit which comprises Zener diode ZD2, diode D6, condenser C9 and resistors. Between the output terminal of the rectifier circuit, which comprises diodes D4 and D5, and the base of the transistor Tr4 of the Schmitt trigger circuit, a time constant circuit and a diode D7 are connected. The time constant circuit is composed of resistors R4 and R5 and a condenser C7. This circuit passes only signals which last for at least 0.4 seconds. An example of such a signal is a busy tone current. The collectors of transistors Tr3, Tr4 and Tr5 are connected to contact y13 of relay Y1 through a resistor. The contact y13 is connected to a d.c. power source.

A confirmation timer circuit 7 is composed of a resistor R6 and condenser C8 connected in series. This circuit is connected to the d.c. source by contact y13. At node *a*, where resistor R6 and condenser C8 of the confirmation timer circuit 7 are connected, is connected the collector of transistor Tr5 of the Schmitt trigger circuit and the base of the transistor Tr1 through a diode D8.

In operation, when a ringing current is present at the terminals L1 and L2, it is rectified by the full-wave rectification circuit 2 through contact y11 of the relay Y1. The rectified current charges condenser C2. Three to ten seconds after the first ringing current, the automatic telephone answering apparatus closes a d.c. circuit (a talking circuit) of a telephone line and begins its answering operation. If this time delay, which may be for example of a duration from three to ten seconds, is not required, the time constant circuit may be omitted and the apparatus activated to begin its recording operation immediately after the first ringing current arrives.

When the voltage across condenser C2 approximates the d.c. source voltage, the voltage across resistor R2 and diode D2 also approximates the d.c. source voltage. Therefore, the base current of the transistor Tr1 can not flow through the diode D3, and transistor Tr1 turns OFF causing transistor Tr2 to turn ON. The turning on of transistor Tr2 causes relay Y1 to be energized thus causing its contacts to be transferred. When relay Y1 is energized *y*11 contact is caused to move to close the talking circuit of the telephone line. Further, condenser C3 begins to discharge through contact *y*12. When the charging voltage of the condenser C3 is decreased to a certain voltage, for example half the d.c. source voltage (requiring a discharging period of about 30 seconds), the transistors of the Schmitt trigger circuit are switched again causing the relay Y1 to release.

During the discharging period of the condenser C3 of the timer circuit 3, an outgoing message which has been previously recorded on a magnetic tape is first read out to a caller by and through the amplifier 5, the line-transformer T and the talking circuit of the telephone line formed by the contact *y*11. After reading out of the outgoing message, a recording situation is automatically prepared with well known means. Then an incoming message from a caller is amplified by the amplifier 5 through the line-transformer T and recorded on a magnetic tape by a magnetic head 5'. A part of the incoming message signal is added into the discriminator circuit 6, simultaneously. There, the signal level is set by the variable resistor VR2, and rectified by diodes D4 and D5. Through the use of variable resistor VR2 low level noises are reduced. High level noises are eliminated by the noise absorbing circuit.

Figure 2:
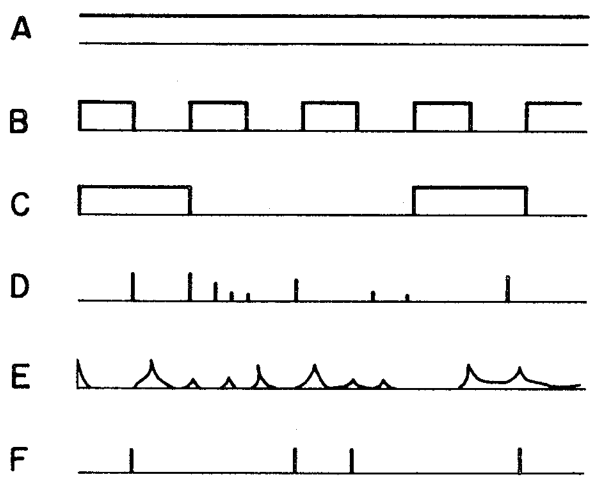
FIG. 2 shows various wave forms added into an automatic telephone answering apparatus through a telephone line.

When intermittent current of a duration of at most 0.4 seconds, (for example a voice signal current, shown as E, or a transient signal current, shown as F in FIG. 2) flows, the current is added into the base of the transistor Tr3 through a differentiation circuit which includes condenser C6. This results in transistor Tr3 turning ON or OFF thus causing the condenser C9 to charge or discharge. In response to the charging voltage of condenser C9, the base bias voltage of the transistor Tr4 is varied through the Zener diode ZD2 and the diode D6. This causes the Schmitt trigger circuit to switch ON or OFF. Intermittent current of a duration of at most 0.4 seconds, can not sufficiently charge up the condenser C8 of the confirmation timer circuit 7. Therefore such a signal is not added into the base of the transistor Tr1 of the switching circuit 4 through the diode D8, and the relay Y1 is continuously energized during the timer period determined by the timer circuit 3. In this manner, the answering operation is held.

When continuous or intermittent current of a duration of at least 0.4 seconds, (for example, current resulting from a dial tone signal A, a busy tone signal B or a calling signal C shown in FIG. 2) is added to the discriminater circuit 6, said current is applied to the Schmitt trigger circuit through the time constant circuit, composed of resistors R4 and R5 and condenser C7, and through the diode D7, resulting in the transistor Tr4 turning ON and the transistor Tr5 turning OFF. With transistor Tr5 off, condenser C8 gradually charges up. Consequently, the base bias signal is added to the base of the transistor Tr1 through the diode D8, and the switching circuit 4 is switched which causes the relay Y1 to release.

When the voice signal is interrupted for ten seconds, the Schmitt trigger circuit is switched by the biasing circuit, composed of condenser C9, Zener diode ZD2 and diode D6, and the confirmation timer circuit 7 is operated so as to send a signal to the switching circuit 4, which causes the relay Y1 to release.

When the predetermined timer period is over, the relay Y1 is released by the switching circuit 4, even if the voice signal arrives continuously. When this occurs the apparatus returns to its stand-by state and does not operate to answer unless the telephone is called again.

According to the present invention, as described hereinabove, only a voice signal can be selected from among several various signals. The apparatus remains in its recording state as long as a voice signal is received within a predetermined timer period, and returns to a stand-by state after the voice signal from a caller is concluded even if the predetermined timer period is not over. For this reason, the disadvantages of the conventional timer control method and the voice control method are eliminated in that the magnetic tape for recording incoming messages is not wasted and a telephone line is not occupied needlessly.

Although the invention has been described with respect to the preferred embodiments thereof, it is understood by those skilled in the art that various modifications can be made in construction and arrangement within the scope of the invention as defined in the appended claims.

What is claimed is:

1. A controller device for an automatic telephone answering apparatus adapted for connection to telephone lines comprising:

relay means for closing the talking circuit of the telephone lines, a switching circuit means for selectively energizing said relay means to close said talking circuit, a starter circuit means, responsive to ring currents on said telephone lines, for causing said switching circuit means to assume a state which causes continuous energization of said relay means, a first time constant circuit means, coupled to said switching circuit means and responsive to the energization of said relay means for switching, after a predetermined time, independent of the presence or absence of incoming signals from said telephone lines, said switching circuit means to a state which causes de-energization of said relay means to thereby open said talking circuit, discriminator means, responsive to incoming signals from said telephone lines, for producing output signals indicative of incoming signals of greater than a first predetermined duration and the absence of incoming signals for a second predetermined duration, and a confirmation timer means, responsive to said output signals for causing said switching circuit means to switch to its state which causes de-energization of said relay means upon receiving incoming signals having a duration greater than said first predetermined duration or upon the absence of incoming signals for said second predetermined duration, wherein said discriminator means comprises a second time constant circuit, a differentiation means and a switching means responsive to said second time constant circuit and said differentiation means and connected to said confirmation timer means.

2. The controller device of claim 1 wherein said second time constant circuit provides switching signals to said switching means to cause said switching means to supply output signals to said confirmation timer means in response to incoming signals of a duration greater than said first predetermined duration, said differentiation means providing switching signals to said switching means to cause said switching means to supply said output signals to said confirmation timer means in response to the absence of incoming signals for more than said second predetermined duration.

3. The controller device of claim 2 wherein said differentiation means comprises a differentiator, a switching transistor and a third time constant circuit, the absence of an incoming signal for more than said second predetermined duration allowing said third time constant circuit to charge to a value sufficient to supply a switching signal to said switching means.

4. The controller device of claim 3 wherein said switching means is a Schmitt trigger circuit and said confirmation timer means is a fourth time constant circuit.

5. The controller device of claim 4 wherein said discriminator means further comprises an incoming signal level setting means and rectifier means.

* * * * *